Patented June 11, 1940

2,203,748

UNITED STATES PATENT OFFICE 2,203,748

PRODUCTION OF CELLULOSE ESTERS

George W. Seymour and Blanche B. White, Cumberland, Md., assignors to Celanese Corporation of America, a corporation of Delaware No Drawing. Application February 28, 1939, Serial No. 258,948

2 Claims. (Cl. 260—230)

This invention relates to the preparation of organic esters of cellulose of high acyl value, and relates more particularly to the production of organic esters of cellulose of high acyl value which are soluble in liquids that do not dissolve the organic esters of cellulose of high acyl value heretofore made, by esterifying cellulose with an esterifying agent and then subjecting the organic esters of cellulose formed to a novel method of hydrolysis or ripening.

An object of this invention is the preparation of stable organic esters of cellulose of very high acyl content which are soluble in liquids that are not solvents for organic esters of cellulose of high acyl content made by prior methods.

Another object of the invention is the preparation of stable organic esters of cellulose of high acyl content which are soluble in a predetermined solvent without any substantial change in their Staudinger viscosity or acyl content.

A further object of this invention is the provision of a novel method of making stable organic esters of cellulose of high acyl content which are soluble in a predetermined solvent without substantially changing their Staudinger viscosity or acyl content.

Another and specific object of this invention is the production of an acetone-soluble cellulose acetate having an acetyl value above 55%, calculated as acetic acid, and a Staudinger viscosity above 0.5.

Other objects of this invention will appear from the following detailed description and claims.

While this invention may be employed in the production of any organic ester of cellulose of high acyl value that is used to form filaments, films, foils, plastics or lacquers, for example, such cellulose esters as cellulose formate, cellulose acetate, cellulose propionate and cellulose butyrate, our invention is of particular importance in the making of cellulose acetate of high acetyl value and, accordingly, it will be described in connection therewith.

Heretofore, cellulose acetate has been prepared by the treatment of cellulose in any suitable form such as cotton, cotton linters or purified wood pulp made by the sulphite, the sulphate or soda process, with an acetylating mixture comprising acetic anhydride, a large amount of acetic acid as solvent for the cellulose acetate that is formed, and a catalyst such as sulphuric acid, phosphoric acid, mixture of these or mixtures of these acids in conjunction with chlorine-containing compounds. Cellulose acetate so formed is not soluble in acetone and in order to impart solubility to the same, the cellulose acetate is ripened or hydrolized. However, when solubility in acetone has been developed in the cellulose acetate made by this method, its acetyl value has been reduced to less than 55%, calculated as acetic acid. Such a method is therefore unsuitable for the production of an acetone-soluble cellulose acetate having an acetyl value substantially above 55%, calculated as acetic acid.

Cellulose acetate of high acetyl value has many desirable properties. Such cellulose acetate does not readily deluster and retains this property over a substantial period of time, so that yarns containing cellulose acetate of high acetyl value of different ages or which have been aged for different lengths of time may be woven together without producing a fabric having defects therein due to differential delustering effected during scouring and dyeing treatments. Cellulose acetate of high acetyl value shows a lower moisture regain and films made from the same have a greater resistance to blush, distortion and cockling. Fabrics prepared from high acetyl cellulose acetate can be processed at higher temperatures in dyeing, thereby increasing the dyeing and levelling rates without the attending tendency to deluster or give a rubbery hand.

We have found that by adding to the primary solution of cellulose acetate suitable solvent-diluents prior to the precipitation there is produced a change in the cellulose acetate making it soluble in a predetermined solvent, such as acetone. This change in the cellulose acetate is not accompanied by any appreciable hydrolysis of the acid groupings of the cellulose acetate nor hydrolysis or breaking down of the size of the cellulose molecule as determined by the Staudinger method. The change is probably due to an internal rearrangement of the molecule which rearrangement may be limited to the end groups or it may be both a change in the end groups as well as a change in the position of the bonds, orientation of the various groups in the molecule, etc.

In accordance with this invention we produce cellulose acetate of high acetyl value and high Staudinger viscosity, which is soluble in solvents in which such a cellulose acetate made by prior methods is insoluble. We make such a cellulose acetate of high acetyl value and high Staudinger viscosity by precipitating the cellulose acetate from a solution thereof in the presence of a diluent which produces in the precipitated cellulose acetate a change other than a change in its acetyl value or viscosity, making it soluble in a solvent in which cellulose acetate of high acetyl value as previously made is not soluble. For example, cellulose acetate having an acetyl value of from 55 to 62.5%, calculated as acetic acid, and a Staudinger viscosity of above 0.5 and that is soluble in acetone may be produced by precipitating cellulose acetate from its primary solution in acetic acid by adding to the said primary solution a suitable solvent-diluent containing a mixture of the solvent-diluent and water, or by adding the solvent-diluent and then precipitating the cellulose acetate by the addition of water.

It is to be understood that the solvent-diluent employed depends upon the solvent in which the resulting ester is to be dissolved. Preferably the solvent-diluent should be water-soluble in order that it may be removed readily from the precipitated cellulose acetate by washing with water. However, other solvent-diluents having little or no solubility in water may be employed and these may be removed from the precipitated cellulose acetate by extraction with liquids other than water. The amount of solvent-diluent added to the primary solution will vary from 1 to 3 parts based on the weight of the primary solution.

We have found that cellulose acetate of high acetyl value which is soluble in acetone and which still retains its high molecular weight may be obtained by employing as solvent-diluents organic compounds having lower boiling points than the solvent employed in the primary solution in which the cellulose acetate is prepared, e. g., esters such as ethyl acetate and methyl acetate, a mixture of such an ester in alcohol, in acetone or in alcohol and acetone, and cyclic oxides and ethers such as dioxan and ethylene formal. We prefer, however, to employ as the solvent diluent methyl acetate of a high degree of purity, preferably chemically pure methyl acetate since the water solubility of this ester is higher than that of the other compounds which can be employed and since it is also a better solvent for cellulose acetate.

The lower monohydric alcohols are not suitable for our purposes since, while they may be employed as diluents for primary solutions of cellulose acetate without effecting precipitation of the cellulose acetate therefrom, they do not change to any appreciable extent the solubility of cellulose acetate in acetone. Moreover, cellulose acetate and other esters which have been made soluble in solvent in which they are normally insoluble may be reconverted to their original insoluble form by dissolving the cellulose acetate or other ester of cellulose and then precipitating the same from its solution in the presence of a solvent-diluent which produces such insolubility.

The amount of solvent-diluent employed depends to some extent upon the concentration of the cellulose ester and the solution from which it is to be precipitated as well as upon the ease of recovery when employed in producing batches of commercial size. It is found desirable, however, to use from 100 to 300 parts of the solvent-diluent to 25 parts of cellulose acetate dissolved in 75 parts of acetic acid.

By employing this invention, there is produced cellulose acetate having an acetyl value of 59 to 61.9%, calculated as acetic acid, and a Staudinger viscosity of above 0.650, and that is soluble in acetone, the cellulose acetate being in a concentration up to 10%. The cellulose acetate is produced by acetylating cellulose with acetic anhydride in the presence of glacial acetic acid as solvent and sulphuric acid as the catalyst and arresting the reaction at the point in which the cellulose is most completely acetylated and before the acetyl value thereof has been reduced by hydrolysis, i. e., when the cellulose acetate has an acetyl value of substantially 62.5. The reaction is arrested by adding any suitable solvent diluent and precipitating with water or other precipitating agents. When employing methyl acetate as the solvent-diluent, cellulose acetate of good stability, having an acetyl value of above 61, calculated as acetic acid, and a Staudinger viscosity above .07 is produced from cellulose acetate which at the point of highest degree of esterification had an acetyl value of 62, calculated as acetic acid, and a Staudinger viscosity of 0.73.

As an aid in describing our invention, but without being limited thereto, the following example is given:

*Example*

7 pounds of solution containing 25% cellulose acetate of 62 acetyl value dissolved in glacial acetic acid is diluted with 14 pounds of methyl acetate. After the methyl acetate has been well stirred into the solution the cellulose acetate is precipitated with water at 30° C., then thoroughly washed and dried. The cellulose acetate is found to have an acetyl value of 60.3, and $SO_4$ content below 0.2, an autoclave stability of .34, a Staudinger viscosity of .7, to be soluble in chloroform and 10.7 parts by weight can be dissolved in 100 parts by weight of acetone containing 2% of water.

The determination of the Staudinger viscosity which is directly proportional to the molecular size of the material being measured is as follows: About 2 cubic centimeters of distilled water at 20° C. are added to the large bulb of an Ostwald viscometer. The small bulb is then filled by suction and all the remaining water in the large bulb is removed. The viscometer is placed in the water bath at 20° C. and let stand for 10 minutes. The time of flow between the marks of viscometer is then determined and the factor for the same ascertained by dividing the viscosity of water at 20° C., 1.008 centipoises, by the time of flow of water in seconds in the viscometer and after several trials results are averaged to three decimal places. $\frac{1}{10}$ gram of dry cellulose acetate is dissolved in 100 cubic centimeters of ethylene formal. The solution is kept at 25° C. in a water bath for one hour. A sample of the solution is then placed in the modified Ostwald viscometer at 25° C. and the time of flow between marks on the viscometer determined. The viscosity is calculated by multiplying the time of flow in seconds by the factor of the viscometer and reported in three decimal places. For the purpose of describing this invention, the Staudinger viscosity employed in the above specification and appended claims is determined by this method.

It is to be understood that the foregoing detailed description is merely given by way of example and that many variations may be made therein without departing from the spirit of our invention.

Having described our invention, what we desire to secure by Letters Patent is:

1. Process for the manufacture of cellulose acetate of high acetyl value characterized by being stable and soluble in acetone, which comprises adding to the primary solution, containing the cellulose acetate, acetic acid as solvent for the cellulose acetate and an acid catalyst, at a point where the cellulose acetate has an acetyl value of substantially 62.5%, calculated as acetic acid, an organic solvent diluent selected from the group consisting of methyl acetate, ethyl acetate, dioxan and ethylene formal and precipitating the cellulose acetate, before appreciable hydrolysis thereof, from the resulting solution, whereby a stable, acetone-soluble cellulose acetate having an acetyl value of 59–61.9%, calculated as acetic acid, and a viscosity above 0.5 as defined is obtained.

2. Process for the manufacture of cellulose acetate of high acetyl value characterized by being stable and soluble in acetone, which comprises adding to the primary solution, containing the cellulose acetate, acetic acid as solvent for the cellulose acetate and an acid catalyst, at a point where the cellulose acetate has an acetyl value of substantially 62.5%, calculated as acetic acid, an organic solvent diluent comprising methyl acetate in an amount substantially equal to twice the weight of the primary solution, and precipitating the cellulose acetate, before appreciable hydrolysis thereof, from the resulting solution, whereby a stable, acetone-soluble cellulose acetate having an acetyl value of 59–61.9%, calculated as acetic acid, and a viscosity above 0.5 as defined is obtained.

GEORGE W. SEYMOUR.
BLANCHE B. WHITE.

CERTIFICATE OF CORRECTION.

Patent No. 2,203,748.  June 11, 1940.

GEORGE W. SEYMOUR, ET AL.

It is hereby certified that error appears in the printed specification of the above numbered patent requiring correction as follows: Page 2, second column, line 12, for ".07" read --0.7--; and that the said Letters Patent should be read with this correction therein that the same may conform to the record of the case in the Patent Office.

Signed and sealed this 30th day of July, A. D. 1940.

Henry Van Arsdale,
Acting Commissioner of Patents.

(Seal)